United States Patent [19]

Sandberg et al.

[11] Patent Number: 5,145,454
[45] Date of Patent: Sep. 8, 1992

[54] PATTY MACHINE

[75] Inventors: Kenneth F. Sandberg, Lockport; Jeffrey A. Mullikin, Bourbonnais, both of Ill.

[73] Assignee: Nutec Manufacturing, Inc., New Lenox, Ill.

[21] Appl. No.: 558,634

[22] Filed: Jul. 26, 1990

[51] Int. Cl.$^5$ ............................................. A47J 43/20
[52] U.S. Cl. ..................................... 452/174; 53/122; 425/556
[58] Field of Search .......................... 452/174; 99/441; 426/513; 425/556, 562, 574; 53/122, 157

[56] References Cited

U.S. PATENT DOCUMENTS

| Re. 31,857 | 4/1985 | Holly . |
| 444,052 | 1/1891 | Hottman . |
| 800,452 | 9/1905 | Kohn . |
| 2,386,775 | 10/1945 | Balzarini . |
| 2,794,210 | 6/1957 | Opiekon . |
| 2,836,775 | 5/1958 | Adkins . |
| 2,858,219 | 10/1958 | Benson . |
| 2,869,602 | 1/1959 | Rathjen . |
| 3,009,413 | 11/1961 | Alexander et al. . |
| 3,052,919 | 9/1962 | Rayburn . |
| 3,111,739 | 11/1963 | Horton et al. . |
| 3,137,029 | 6/1964 | De Zolt . |
| 3,163,541 | 12/1964 | Mainhardt et al. . |
| 3,221,672 | 12/1965 | Falco . |
| 3,293,688 | 12/1966 | Holly . |
| 3,296,655 | 1/1967 | Vidjak et al. . |
| 3,574,633 | 4/1971 | Flier . |
| 3,609,806 | 10/1971 | Schippers et al. . |
| 3,675,387 | 7/1972 | Lekan ................................. 53/122 |
| 3,725,974 | 4/1973 | Kuhlman . |
| 3,747,160 | 7/1973 | Holly et al. . |
| 3,793,466 | 2/1974 | Kawkins et al. . |
| 3,834,849 | 9/1974 | Supran et al. . |
| 3,851,355 | 12/1974 | Hughes . |
| 3,863,020 | 1/1975 | Robinson . |
| 3,903,315 | 9/1975 | Giles et al. . |

(List continued on next page.)

FOREIGN PATENT DOCUMENTS

| 115244 | 6/1942 | Australia . |
| 1299087 | 6/1961 | France . |
| 7501763 | 8/1975 | France . |
| 939124 | 10/1963 | United Kingdom . |
| 1146370 | 3/1969 | United Kingdom . |
| 1207623 | 10/1970 | United Kingdom . |
| 1454216 | 11/1976 | United Kingdom . |

Primary Examiner—Willis Little
Attorney, Agent, or Firm—Wood, Phillips, Van Santen, Hoffman & Ertel

[57] ABSTRACT

In order to effectively and efficiently produce patties in a machine, particularly at a high rate of speed and while maintaining a consistent level as to the quality of production, a patty machine is disclosed which includes a casting, a ram, a mold plate, and a drive system. The casting has a cavity which is adapted to receive a material to be formed into a patty at an inlet located intermediate opposite ends thereof. The ram is reciprocably disposed within the cavity at a point upstream of the inlet, and the mold plate is reciprocably disposed relative to the cavity at a point downstream of the inlet. With this arrangement, the drive system imparts simultaneous reciprocating movement to the ram and the mold plate. The mold plate may cooperate with a knockout assembly where both the mold plate and the knockout assembly are driven through a hydraulic system in a coordinated fashion. The patties may be thus be discharged from the mold plate onto papers which are delivered one at a time for the purpose of forming a paper separated patty stack on a supporting surface. Additionally, the ram, mold plate, and casting are configured so that material is forced through a restricted passage, into a mold-filling chamber, and finally to a patty mold opening.

62 Claims, 7 Drawing Sheets

U.S. PATENT DOCUMENTS

| | | |
|---|---|---|
| 3,939,530 | 2/1976 | Holly . |
| 3,940,217 | 2/1976 | McCarthy et al. . |
| 3,947,535 | 3/1976 | Bagg et al. . |
| 3,991,440 | 11/1976 | Hendrickson, Jr. . |
| 4,036,997 | 7/1977 | VerBurg . |
| 4,043,728 | 8/1977 | Holly . |
| 4,068,008 | 1/1978 | Orchard . |
| 4,097,961 | 7/1978 | Richards ............... 425/556 |
| 4,113,415 | 9/1978 | Holly . |
| 4,118,169 | 10/1978 | Haluska . |
| 4,118,831 | 10/1978 | Holly et al. . |
| 4,138,768 | 2/1979 | Roth . |
| 4,148,598 | 4/1979 | Colosimo et al. . |
| 4,153,974 | 5/1979 | Holly et al. . |
| 4,182,003 | 1/1980 | Lamartino et al. . |
| 4,205,415 | 6/1980 | Orchard . |
| 4,272,864 | 6/1981 | Holly . |
| 4,293,979 | 10/1981 | Colosimo et al. . |
| 4,317,259 | 3/1982 | Wagner . |
| 4,329,828 | 5/1982 | Wagner ...................... 53/122 |
| 4,338,702 | 7/1982 | Holly . |
| 4,343,068 | 8/1982 | Holly . |
| 4,356,595 | 11/1982 | Sandberg et al. . |
| 4,372,008 | 2/1983 | Sandberg . |
| 4,422,372 | 12/1983 | Hoezee . |
| 4,535,505 | 8/1985 | Holly et al. . |
| 4,541,143 | 9/1985 | Holly . |
| 4,597,135 | 7/1986 | Holly et al. . |
| 4,608,731 | 9/1986 | Holly . |
| 4,768,260 | 9/1988 | Sandberg ...................... 425/556 |
| 4,981,430 | 1/1991 | Zimmerman, Jr. ............ 425/556 |

PATTY MACHINE

FIELD OF THE INVENTION

The present invention is directed to a machine for automating the production of patties and, more particularly, a patty machine operating a ram, mold plate, and knockout assembly through a hydraulic drive system.

BACKGROUND OF THE INVENTION

Before automation, it was common to form patties of a material such as ground beef by hand. It is well known, however, that, while effective for the intended purpose, this technique had numerous drawbacks including the unsanitary conditions of excess human contact with the meat product, the inefficiencies clearly inherent in the hand-forming process, the lack of uniformity in terms of the weight of the patties so formed, and a lower level of quality due to the inexact size and shape of the patties. However, many of these deficiencies were more acceptable in earlier times.

In more recent years, there has been a burgeoning need for a successful means for automating the production of patties. This is evident from the widespread proliferation of fast food franchises which sell massive numbers of frozen patties on a daily basis. In order to serve this need, it has been common to commercially utilize a variety of different machines from various equipment manufacturers.

Despite the availability of such machines, it is recognized that drawbacks exist in the automation of the patty making process. These range from the lack of a truly effective ram-casting-mold plate configuration and arrangement to the absence of an acceptably coordinated knockout assembly for discharging patties from the machine. Still additionally, there has been considerable room for improvement in the paper feed and hydraulic systems utilized in such equipment.

The present invention is directed to overcoming one or more of the foregoing problems and accomplishing one or more of the resulting objects.

SUMMARY OF THE INVENTION

It is a principal object of the present invention to provide a patty machine that successfully overcomes the deficiencies of the prior art. It is also an object of the present invention to provide a patty machine having a unique ram and mold plate configuration, an effective knockout assembly, and a hydraulic drive system to accurately control pressure. It is a further object of the present invention to provide a patty machine having a unique paper feed system for patties discharged therefrom.

Accordingly, the present invention is directed to a patty machine having a casting, a ram, and a mold plate wherein the casting has a cavity for receiving a material to be formed into a patty. The ram is reciprocably disposed within the cavity at a point upstream of an inlet. In this connection, the inlet is provided for directing the material into the cavity at a point intermediate opposite ends thereof. The mold plate is also reciprocably disposed relative to the cavity at a point downstream of the inlet. With this arrangement, the patty machine still further includes means for imparting simultaneous reciprocating movement to the ram and the mold plate relative to the casting.

In a preferred embodiment, the cavity in the casting has a first portion extending generally in the direction of reciprocating movement of the ram and the mold plate and a second portion extending generally perpendicular to the direction of movement of the ram and the mold plate. Preferably, the second portion of the cavity includes a restricted passage leading from the first portion of the cavity to a mold-filling chamber axially offset from the ram and having a reduced cross-sectional area in comparison with the first portion of the cavity. Further, the mold plate reciprocates into and out of communication with the mold-filling chamber as the ram reciprocates toward and away from the restricted passage for forcing the material from the inlet through the cavity and into the mold plate.

Advantageously, the cavity is formed in one face of the casting and the patty machine includes a fill plate which is secured to the casting so as to generally cover the face of the casting in which the cavity is formed. The fill plate then suitably includes an opening in communication with the mold-filling chamber and the mold plate reciprocates on the fill plate between a pair of guide rails for guiding reciprocating movement thereon. In addition, the patty machine may also include a breather plate having a plurality of holes disposed generally above the mold-filling cavity together with a cap plate disposed above the breather plate.

More specifically, the mold plate preferably has a patty mold opening therein and reciprocates between the fill plate and the breather plate, and the holes in the breather plate communicate with a cavity covered by the cap plate for receiving air and material thereinto. It is also advantageous for the fill plate to include a material hopper communicating with the inlet at a point axially adjacent one of the guide rails which guide rail includes a slot providing communication between the cavity in the breather plate and the material hopper. Still further, the patty machine may advantageously include a material feed tray supported to accommodate feeding material to the material hopper together with a cage guard for the material hopper which extends into the material feed tray for allowing passage of only the material therethrough.

In a highly preferred embodiment, the drive assembly includes a pair of generally parallel side shafts extending through corresponding bores in the casting which side shafts are interconnected at corresponding opposite ends by a pair of drive bars. The drive assembly also may suitably include a main drive cylinder interconnected to one of the drive bars for imparting reciprocating movement, and the ram and the mold plate are also interconnected to one of the drive bars whereby they likewise undergo driven movement by the main drive cylinder. With this arrangement, a ram cylinder preferably interconnects the ram to the one of the drive bars so as to ensure that the ram imparts only a preselected pressure to the material in the cavity when the main drive cylinder is imparting reciprocating movement to the drive assembly.

In a highly preferred embodiment, the patty machine includes means for adjusting the preselected pressure in the form of a hydraulic fluid flow valve which causes the ram cylinder to release pressure on the ram at the preselected pressure. The ram cylinder receives hydraulic fluid under pressure from a source and the drive assembly includes a bypass comprising a hydraulic fluid return flow path through which the ram cylinder returns hydraulic fluid to the source in such a manner as to be able to substantially maintain but not exceed the preselected pressure on the material. Still additionally, the hydraulic fluid return flow path advantageously includes a port in one of the drive bars such that the ram cylinder communicates with that port to deliver hydraulic fluid back to the source through a passage through that drive bar and one of the side shafts.

As previously suggested, the mold plate undergoes reciprocating movement in such a manner that the patty mold opening moves into and out of communication with the cavity for receiving the material as the ram also undergoes reciprocating movement toward and away from the inlet, respectively. The ram forces the material into the patty mold opening to form a patty following which the patty is discharged by means for removing the patty from the patty mold opening after the mold plate has undergone reciprocating movement to a position where it is out of communication with the cavity. Still more specifically, the mold plate preferably reciprocates in a generally horizontal plane in which case the patty removing means includes a knockout assembly mounted for vertical reciprocating movement, and the patties are discharged onto a patty receiving surface disposed below the generally horizontal plane of reciprocation.

As for the knockout assembly, it preferably includes a vertical knockout shaft, a knockout arm extending from one end thereof so as to be disposed generally above the mold plate, and a knockout cup conforming to the patty mold opening and supported by the knockout arm. The knockout assembly also advantageously includes a lift block secured to the end of the vertical knockout shaft remote from the knockout arm and a pivoting knockout lift arm secured to the lift block for imparting reciprocating vertical movement to the knockout shaft. With this arrangement, the knockout assembly further preferably includes a drive pivot block secured to the casting, the lift arm is mounted for pivotable movement to the drive pivot block, and a drive cylinder is connected to the lift arm through a clevis block.

In addition to the foregoing, the knockout assembly further preferably includes a knockout latch mounted for pivotable movement to the drive pivot block and the lock latch and lift arm have overlapping teeth adapted for engagement for locking the lift arm in position. Advantageously, the knockout assembly additionally includes a latching bar having a pusher plate mounted thereon for movement toward engagement of a pin on the lock latch to cause the lock latch to pivot against the biasing force of a spring to disengage the overlapping teeth. Still additionally, the lock latch and latching bar also preferably have overlapping teeth adapted for locked engagement whereby the overlapping teeth of the lock latch and latching bar engage as the overlapping teeth of the lock latch and lift arm are disengaging.

In a most highly preferred embodiment, the drive cylinder drives the knockout shaft in a single cycle first down and then up through the clevis block, lift arm and lift block by reversing direction through limit switch means sensitive to travel of the drive cylinder relative to the casting. With this understanding of the operation, the spring is effective for reengaging the overlapping teeth of the lock latch and lift arm following that one cycle which also then causes the overlapping teeth of the lock latch and latching bar to disengage for movement of the latching arm away from the pin.

In another respect, the patty machine preferably includes a paper feeder assembly comprising a paper hopper adapted to hold papers in a generally vertical stack and a spring biased roller engaging the bottom of the generally vertical stack including means for driving the roller in a single direction. The paper feeder assembly may then further advantageously comprise an individual paper receiving frame adjacent the generally vertical stack with the roller being adapted to feed the papers one at a time from the generally vertical stack into the paper receiving frame. With this arrangement, the paper feeder assembly is preferably mounted such that the paper receiving frame is in a position below the generally horizontal plane of reciprocation of the mold plate and above the patty receiving surface in substantial vertical alignment with the knockout assembly.

Other objects, advantages and features of the present invention will become apparent from a consideration of the following specification taken in conjunction with the accompanying drawings.

DETAILED DESCRIPTION OF THE PREFERRED EMBODIMENT

Figure 1:
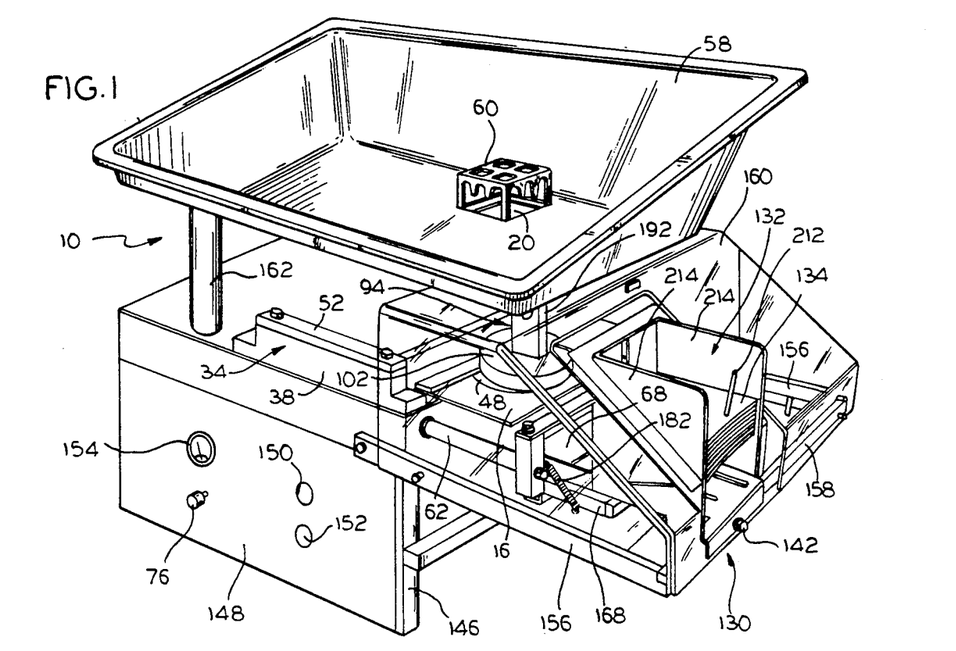
FIG. 1 is a perspective view of a patty machine in accordance with the present invention.

In the illustration given, and with reference first to FIG. 1, the reference numeral 10 designates generally a patty machine incorporating the inventive aspects of the present invention. The patty machine includes a casting 12, a ram 14,, and a mold plate 16 wherein the casting 12 has a cavity 18 for receiving a material such as ground beef to be formed into a patty (see FIG. 3A). The material is directed into the cavity 18 through an inlet 20 at a point intermediate opposite ends 22 and 24 thereof, and the ram 14 is reciprocably disposed within the cavity 18 at a point upstream of the inlet 20 with the mold plate 16 being reciprocably disposed relative to the cavity 18 at a point downstream of the inlet 20. The patty machine 10 further includes means for imparting simultaneous reciprocating movement to the ram 14 and the mold plate 16 in the form of a drive assembly generally designated 26 (see FIG. 3B). As will be appreciated, the drive assembly 26 will be discussed in detail hereinafter in relation to its ability to impart simultaneous reciprocating movement to the ram 14 and the mold plate 16.

Figure 3A:
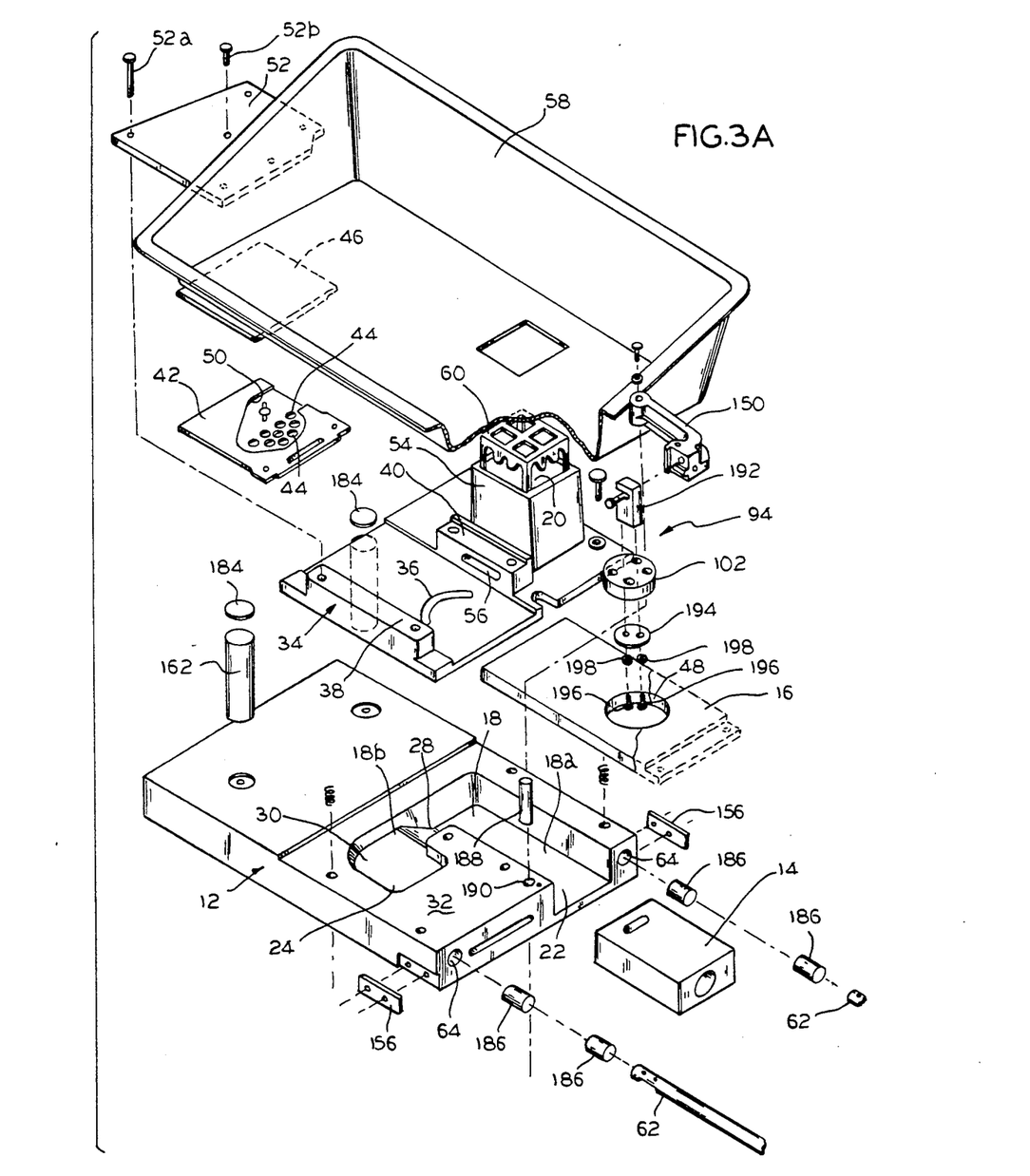
FIG. 3A is a first exploded perspective view of various components of the patty machine of FIG. 1.

Referring specifically to FIG. 3A, the cavity 18 in the casting 12 includes a first portion 18a extending generally in the direction of reciprocating movement of the ram 14 and the mold plate 16 and a second portion 18b extending generally perpendicular to the direction of movement of the ram 14 and the mold plate 16. The second portion 18b of the cavity 18 includes a restricted passage as at 28 leading from the first portion 18a of the cavity 18 to a mold-filling chamber as at 30 which is axially offset from the ram 14 and has a reduced cross-sectional area in comparison with the first portion 18a of the cavity 18. As will be appreciated, the mold plate 16 reciprocates into and out of communication with the mold-filling chamber 30 as the ram 14 reciprocates toward and away from the restricted passage 28 for forcing the material received through the inlet 20 on through the remainder of the cavity 18 into the mold plate 16.

Still referring to FIG. 3A, the cavity 18 is formed in one face 32 of the casting 12 and a fill plate 34 which includes an opening 36 in communication with the mold-filling chamber 30 generally covers the face 32. The mold plate 16 actually reciprocates on the fill plate 34 between a pair of guide rails 38 and 40 which are an integral part of the fill plate 34 for guiding reciprocating movement of the mold plate 16 thereon. As also shown in FIG. 3A, the patty machine 10 includes a breather plate 42 having a plurality of holes 44 disposed generally above the mold-filling cavity 30 and a cap plate 46 disposed above the breather plate 42.

With this arrangement, the mold plate 16 is formed to have a patty mold opening 48 and reciprocates between the fill plate 34 and the breather plate 42, and the holes 44 in the breather plate 42 communicate with a cavity 50 covered by the cap plate 46 and a top plate 52 for receiving air and material thereinto. Four screws 52a at the corners hold the top plate 52 in position while two additional screws 52b apply pressure to the cap plate 46 and the breather plate 42 to also maintain them in position and this also applies pressure to the mold plate 16. It will also be seen that the fill plate 34 includes a material hopper 54 communicating with and actually defining the inlet 20 at a point axially adjacent one of the guide rails 40 which guide rail includes a slot 56 providing communication between the cavity 50 in the breather plate 42 and the material hopper 54. Still additionally, the patty machine 10 includes a material feed tray 58 supported to accommodate feeding material into the inlet 20 defined by the material hopper 54 together with a cage guard 60 for the material hopper 54 which extends into the feed tray 58 for allowing passage of only the material therethrough.

Of course, it will be appreciated that the ram 14, mold plate 16 and patty mold opening 48 can be of various sizes and shapes depending upon the particular application.

As will be appreciated from FIG. 3A, the casting 12 is generally rectangular in shape and the first portion 18a of the cavity 18 has a rectangular cross section. As a result, the ram 14 will likewise comprise a generally rectangular block sized so as to be capable of reciprocating movement therewithin. As will also be appreciated from FIG. 3A, the mold plate 16 is generally rectangular and the patty mold opening 48 is circular in the illustrated embodiment.

Figure 3B:
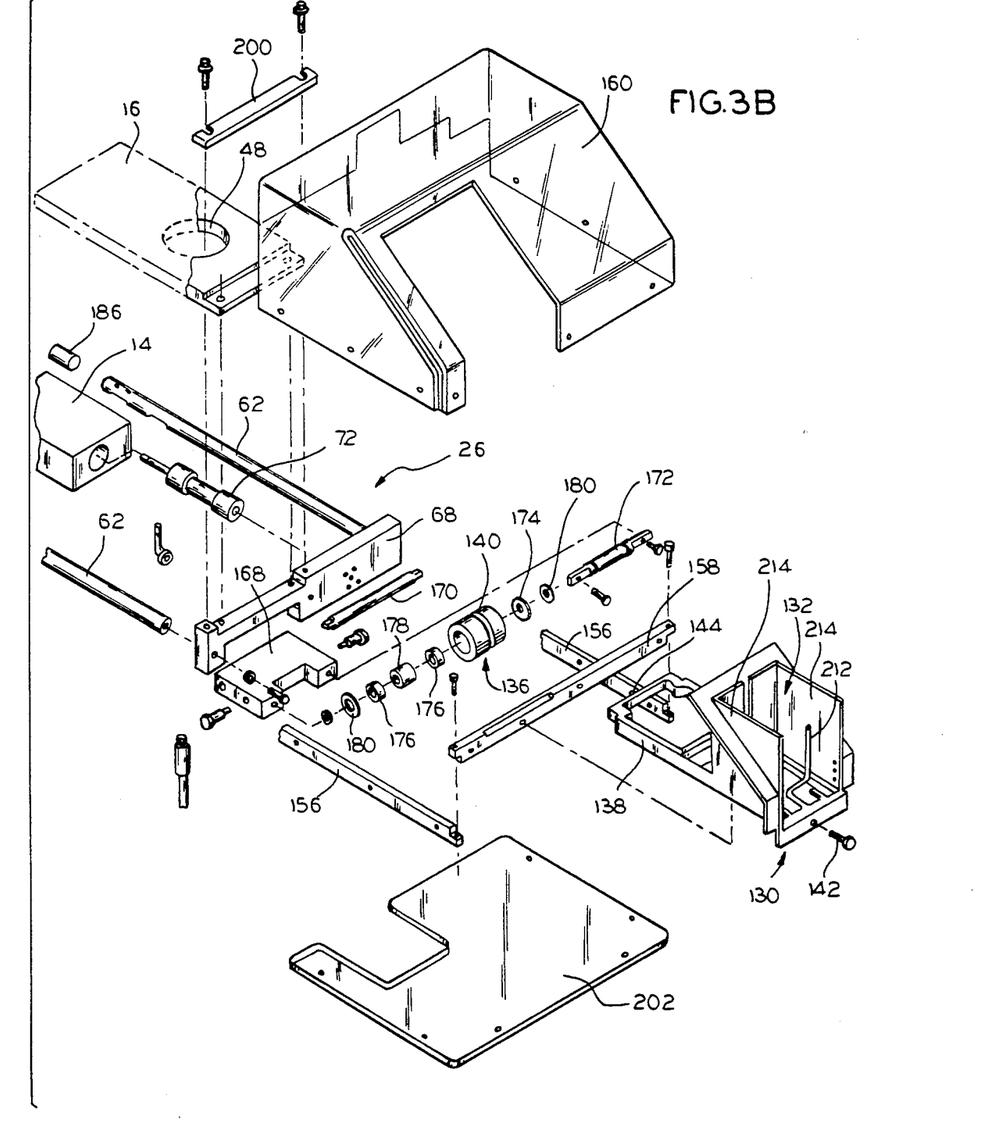
FIG. 3B is a second exploded perspective view of various components of the patty machine of FIG. 1.

As previously mentioned, the reciprocating movement imparting means comprises a hydraulic reciprocating drive assembly 26 adapted to drive the mold plate 16 and the ram 14 in generally parallel simultaneous reciprocating movement relative to the casting 12. The drive assembly 26 will be seen to include a pair of generally parallel side shafts 62 which extend through corresponding bores 64 in the casting 12, and the side shafts 62 are interconnected at corresponding opposite ends by a pair of drive bars 66 and 68 (see, also, FIG. 3C). The drive assembly 26 also includes a main drive cylinder 70 which is interconnected to one of the drive bars 66 for imparting reciprocating movement, and the ram 14 and the mold plate 16 are similarly interconnected to the other of the drive bars 68 for driven movement by the main drive cylinder 70. As shown in FIG. 3B, a ram cylinder 72 interconnects the ram 14 to the drive bar 68 for imparting only a preselected pressure to the material in the cavity 18 when the main drive cylinder 70 is imparting reciprocating movement to the drive assembly 26.

Figure 2:
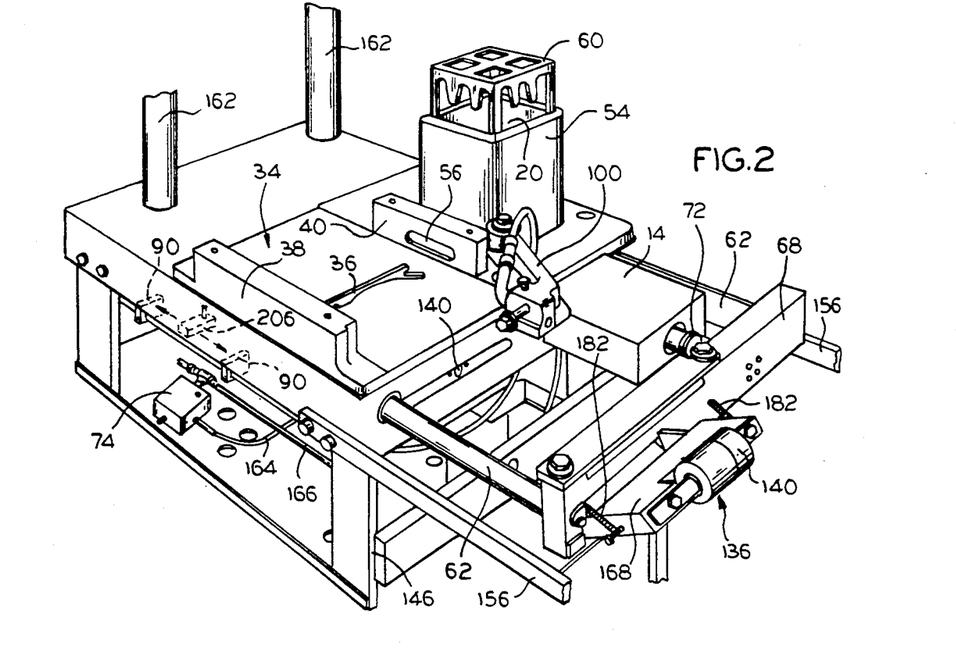
FIG. 2 is a perspective view similar to FIG. 1 with the paper feeder assembly and material feed tray removed.
Figure 8:
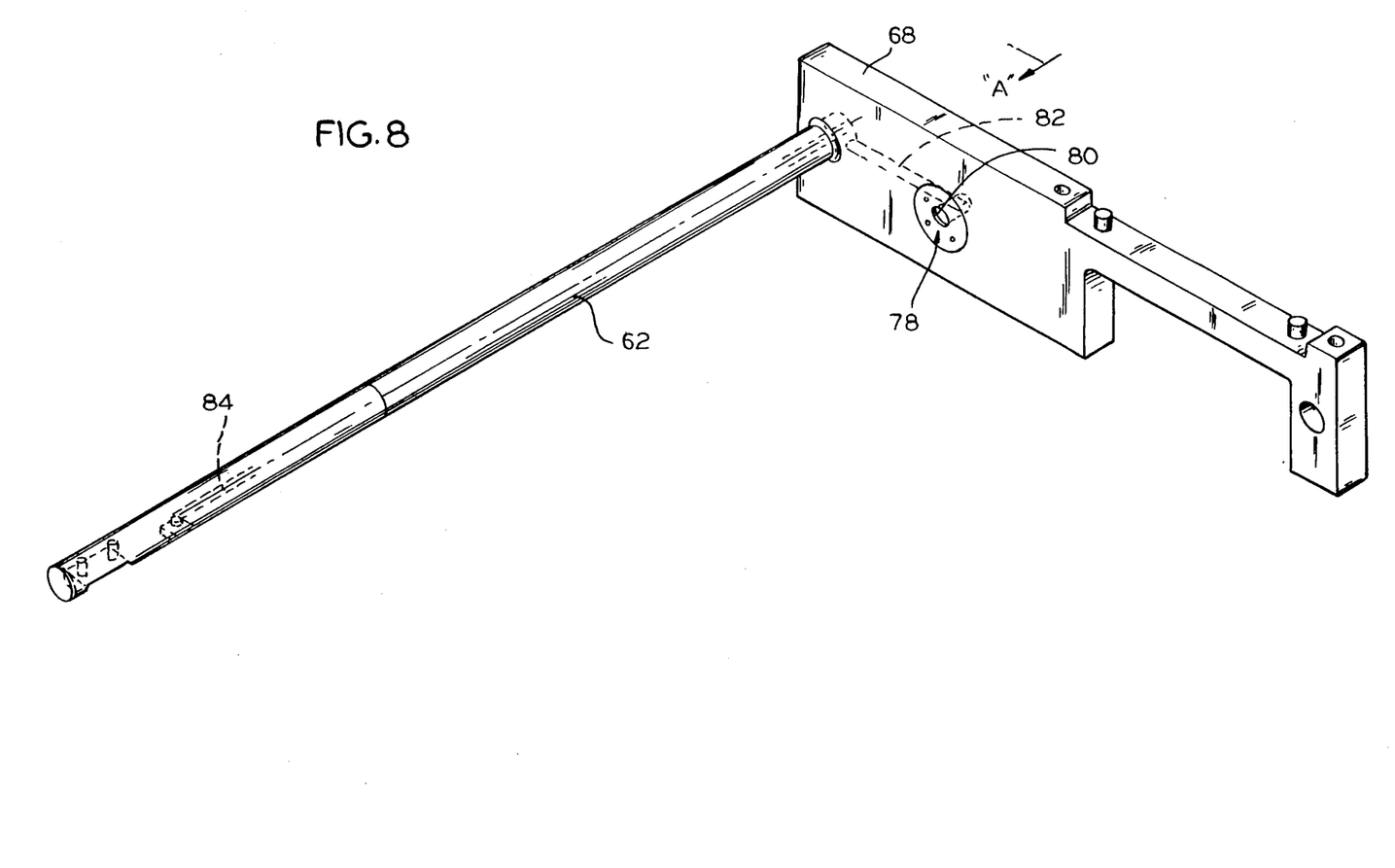
FIG. 8 is a perspective view of a portion of the hydraulic drive system of the patty machine of FIG. 1.

Referring to FIGS. 1 and 2, the patty machine 10 includes means for adjusting the preselected material pressure in the form of a hydraulic fluid flow valve 74 accessible from the exterior of the patty machine 10 by a control knob 76. The hydraulic fluid flow valve 74 causes the ram cylinder 72 to release pressure on the ram 14 in such a manner as to maintain the preselected pressure on the material. The ram cylinder 72 receives hydraulic fluid under pressure from a source (not shown). The drive assembly 26 includes a bypass which is generally designated 78 and through which the ram cylinder 72 returns hydraulic fluid to the source. As shown in FIG. 8, the bypass 78 includes a port 80 in the drive bar 68, the ram cylinder 72 communicates with the port 80, and at least the drive bar 68 has a passage 82 leading from the port 80 to the source.

In the preferred embodiment, the bypass 78 also includes a further passage 84 leading from the passage 82 in the drive bar 68 through the next adjacent of the side shafts 62 to a hydraulic fluid flow line which then extends to the source of hydraulic fluid.

Figure 3C:
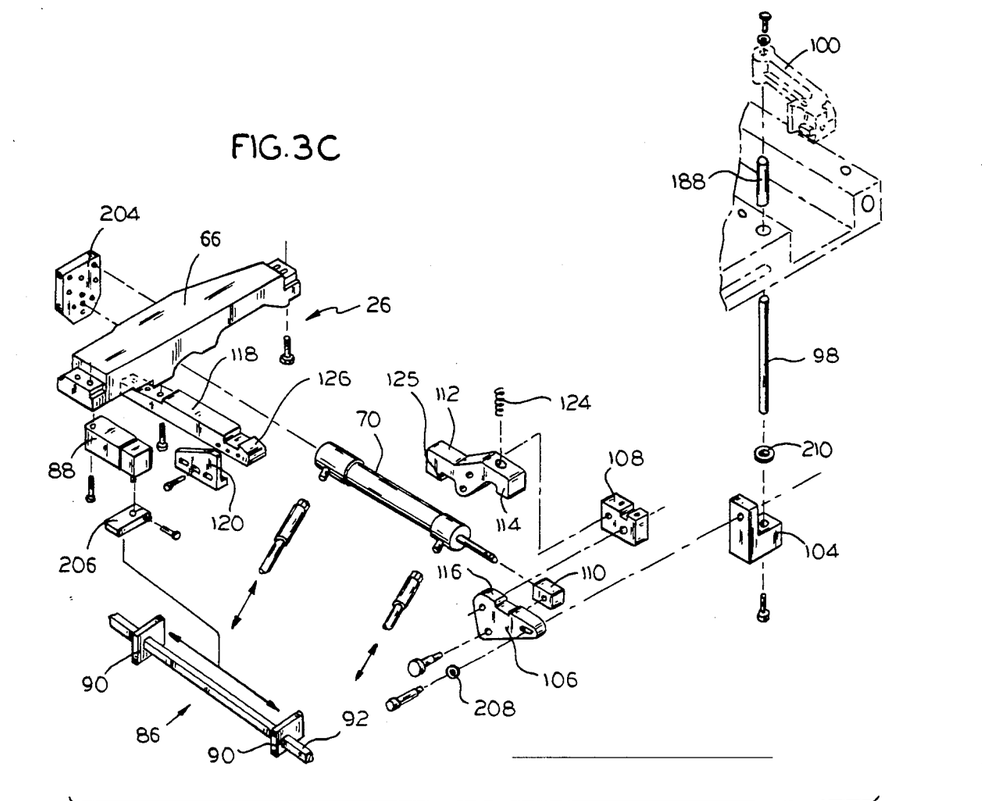
FIG. 3C is a third exploded perspective view of various components of the patty machine of FIG. 1.

Referring now to FIG. 3C, the patty machine also includes a limit switch assembly generally designated 86 which is adapted to limit travel of the drive assembly 26 in each direction during reciprocating movement. As shown, the limit switch assembly 86 includes a limit switch 88 mounted to the drive assembly 26 and a pair of spaced apart trip blocks 90 fixedly but adjustably mounted on a block support bar 92.

As previously mentioned, the mold plate 16 has a patty mold opening 48 which undergoes reciprocating movement into and out of communication with the cavity 18 for receiving the material through the opening 36 in the fill plate 34 as the ram 14 undergoes reciprocating movement toward and away from the inlet 20, respectively. The ram 14 forces the material into the patty mold opening 48 to form a patty and includes means for removing the patty from the patty mold opening 48 after the mold plate 16 has undergone reciprocating movement to a position where it is out of communication with the cavity 18. With the mold plate 16 adapted to reciprocate in a generally horizontal plane, the patty removing means includes a knockout assembly generally designated 94 which is mounted for vertical reciprocating movement and the patty receiving surface 96 is disposed below the generally horizontal plane of movement of the mold plate 16 (see FIGS. 3A and 7).

As will also be seen, the knockout assembly 94 includes a vertical knockout shaft 98, a knockout arm 100 extending from one end thereof so as to be disposed generally above the mold plate 16, and a knockout cup 102 conforming to the patty mold opening 48 and supported by the knockout arm 100. The knockout assembly 94 also includes a lift block 104 secured to the end of the vertical knockout shaft 98 remote from the knockout arm 100 (see, also, FIG. 3C) and a pivoting knockout lift and lock arm 106 secured to the lift block 104 for imparting reciprocating vertical movement to the knockout shaft 98 in a manner that will be described hereinafter. Still referring to FIG. 3C, the knockout assembly 94 further includes a drive pivot block 108 secured to the underside of the casting 12, the lift and lock arm 106 being mounted for pivotable movement to the drive pivot block 108, and the drive cylinder 70 is connected to the lift and lock arm 106 through a clevis block 110.

Figure 4:
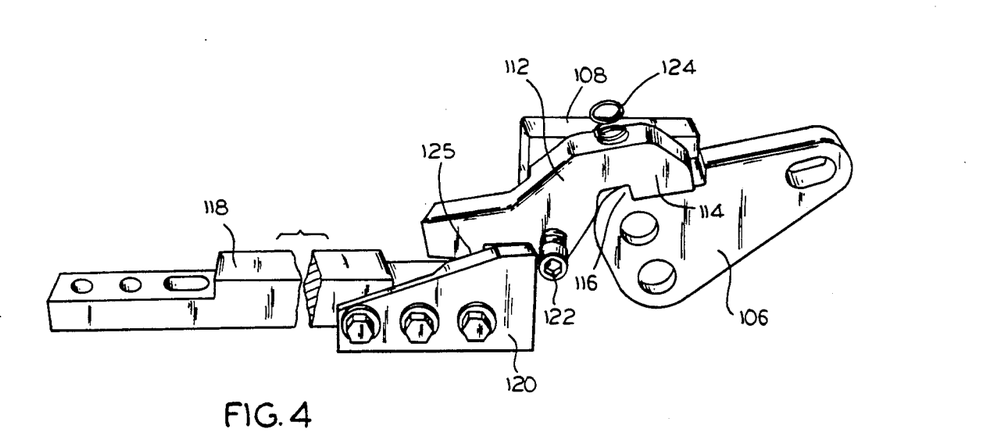
FIG. 4 is a perspective view of a portion of the knockout assembly of the patty machine of FIG. 1.
Figure 5A:
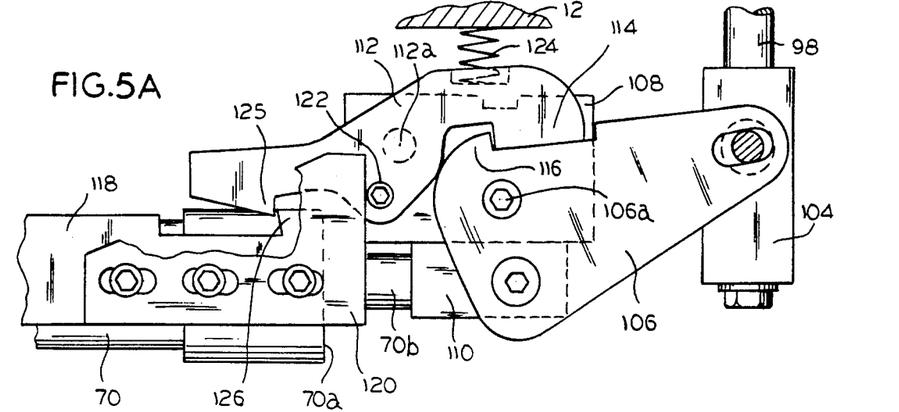
FIG. 5A is a first elevational view of a portion of the knockout assembly of the patty machine of FIG. 1.

Referring to FIGS. 3C, 4, and 5A-5C, the knockout assembly 94 includes a knockout lock latch 112 mounted for pivotable movement to the drive pivot block 108, and the lock latch 112 and lift and lock arm 106 have overlapping teeth 114 and 116 adapted for engagement for locking the lift and lock arm in position as shown in FIGS. 4 and 5A. The knockout assembly 94 further includes a latching bar 118 having a pusher p late 120 mounted thereon for movement toward engagement of a pin 122 on the lock latch 112 to pivot against the biasing force of a spring 124 to disengage the overlapping teeth 114 and 116. With this arrangement, it will also be seen and appreciated that the lock latch 112 and latching bar 118 have overlapping teeth 125 and 126 which are adapted for locked engagement as the overlapping teeth 114 and 116 of the lock latch 112 and lift and lock arm 106 are disengaging (see FIGS. 5B and 5C).

Figure 5B:
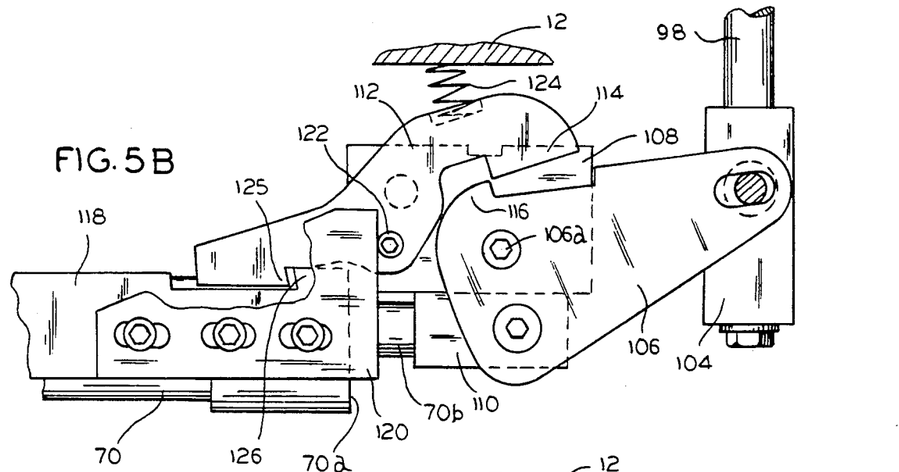
FIG. 5B is a second elevational view of a portion of the knockout assembly of the patty machine of FIG. 1.
Figure 5C:
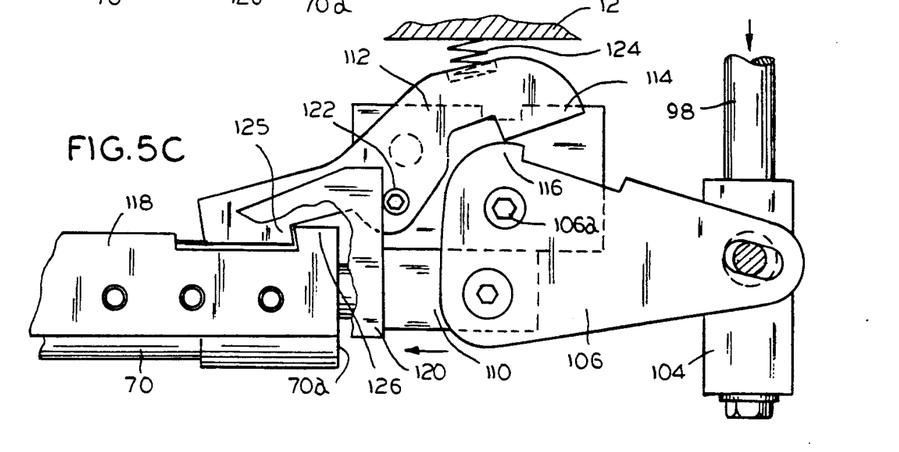
FIG. 5C is a third elevational view of a portion of the knockout assembly of the patty machine of FIG. 1.
Figure 6:
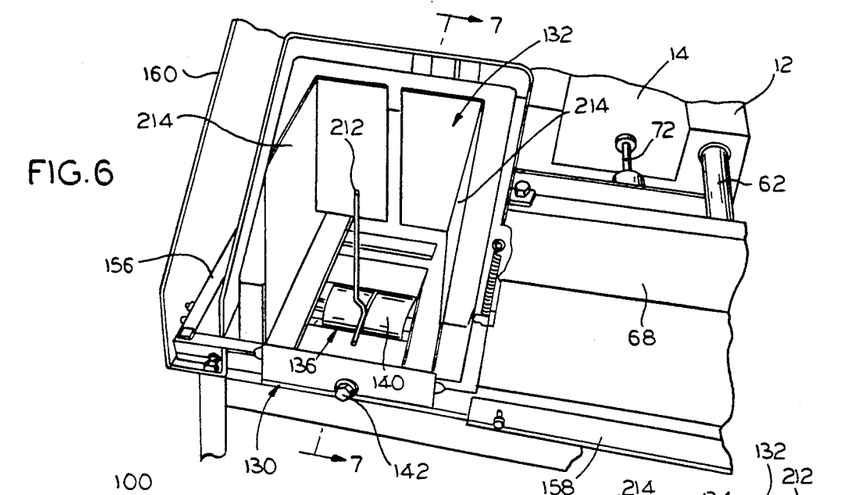
FIG. 6 is a partial perspective view of the paper feeder assembly of the patty machine of FIG. 1.

By following the sequence illustrated in FIGS. 5A-5C, it will be appreciated that the drive cylinder 70 drives the knockout shaft 98 in one cycle first down and then up through the clevis block 110, lift and lock arm 106 and lift block 104 by reversing direction through the limit switch assembly 86 which is sensitive to travel of the drive cylinder 70 relative to the casting 12. With this basic understanding of the knockout assembly 94, it will also be appreciated that the spring 124 reengages the overlapping teeth 114 and 116 of the lock latch 112 and lift and lock arm 106 following that one cycle which also causes the overlapping teeth 125 and 126 of the lock latch 112 and latching bar 118 to disengage for movement of the latching arm 118 away from the pin 122 (see FIG. 5A).

More specifically, it will be appreciated that the pusher plate 120 engages the pin 122 when the drive cylinder 70 is moving to the right as shown in FIG. 5A. This causes the lock latch 112 to begin pivoting about the pin 112a by which it is pivotally mounted to the drive pivot block 108. The drive cylinder 70 continues moving to the right until its face 70a hits the drive pivot block 108 as shown in FIG. 5B. The pusher plate continues to pivot the lock latch 112 until this occurs at which point the overlapping teeth 114 and 116 are disengaged. The overlapping teeth 125 and 126 are also caused to become engaged as this occurs as shown in FIG. 5B. The piston rod 70b of the drive cylinder 70 is then free to cause the lift and lock arm 106 to pivot about the pin 106a. The limit switch assembly 86 controls the stroke of the piston rob 70b first to the right and then to the left and then to the right. The movement of the piston rod 70b causes the lift and lock arm to pivot first counterclockwise and then clockwise. The pivoting movement of the lift and lock arm 106 causes the knockout shaft 98 to first move vertically upward and then vertically downward. The spring 124 causes the lock latch 112 to begin pivoting back toward engagement with the lift and lock arm 106 when the lift block reaches its uppermost point of movement. As will be appreciated, this also causes the lock latch to move out of engagement with the latching bar 118 allowing the cylinder 70 to move it to the left away from the drive pivot block 108.

Referring now to FIGS. 1, 2, 3B, 6 and 7, the patty machine 10 includes a paper feeder assembly generally designated 130 which comprises a paper hopper 132 adapted to hold papers as at 134 in a generally vertical stack together with a spring biased roller assembly 136. The spring biased roller assembly engages the bottom of the generally vertical stack of papers 134 and includes means for driving the roller assembly 136 in a single direction. The paper feeder assembly 130 further comprises an individual paper receiving frame 138 adjacent the generally vertical stack of papers 134. The roller 140 of the roller assembly 136 is adapted to feed the papers 134 one at a time from the generally vertical stack into the paper receiving frame 138. As shown in the drawings, the paper receiving frame 138 is positioned at a point below the generally horizontal plane of reciprocation of the mold plate 16 and yet above the patty receiving surface 96 in substantial vertical alignment with the knockout assembly 94.

With this understanding, the patty machine 10 also includes another unique feature in conjunction with the paper feeder assembly 130 in the form of a proximity switch 140. The proximity switch 140 permits machine operation only when engaged and, thus, with the paper feeder assembly 130 being removably mounted to the patty machine 10 as by a screw 142, the proximity switch 140 incorporates a unique safety feature. More specifically, the paper feeder assembly 130 includes a projection 144 for engaging the proximity switch 140 and thus activating the patty machine 10 only when it is properly mounted in its intended position.

Referring to FIG. 1, the patty machine 10 preferably includes a frame assembly generally designated 146 together with one or more guard panels 148 extending thereabout. It will also be seen that the patty machine 10 will include a stop switch 150 and a start switch 152 as well as a product pressure gauge 154. Still further, the patty machine 10 will include a pair of paper hopper support bars 156 joined at their remote ends by a paper hopper mounting bar 158.

As shown in FIG. 1, the patty machine 10 preferably includes a front guard 160 which substantially encloses the movable components. It will also be appreciated that the feed tray 58 may advantageously be supported on a pair of support posts 162 in addition to the material hopper 54. As shown in FIG. 1, the cage guard 60 extends into the feed tray 58 when mounted on the material hopper 54 and support posts 162.

Figure 7:
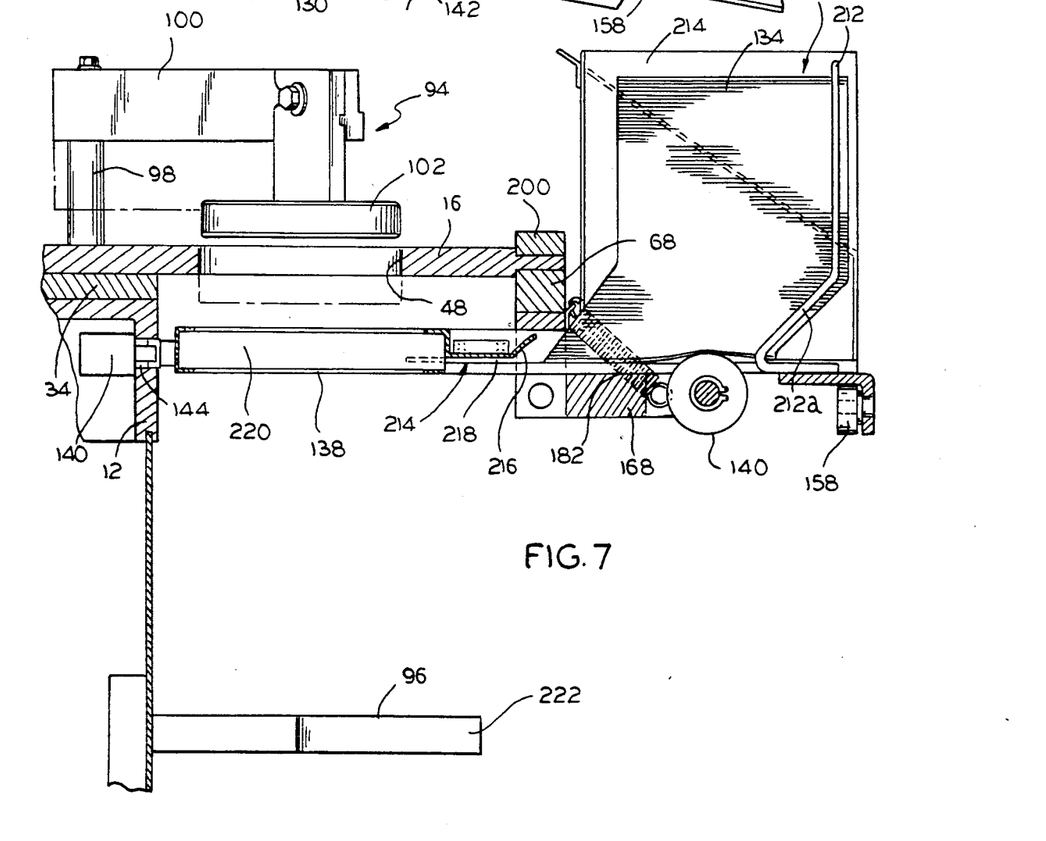
FIG. 7 is a cross-sectional view of the paper feeder assembly taken on the line 7—7 of FIG. 6.

Referring to FIG. 2, it will be appreciated that some of the hydraulic lines 164 and 166 have been illustrated by way of example, and it will also be noted that the roller assembly 136 has been shown with some specificity in FIGS. 1, 3B and 7. The roller assembly 136 includes a paper feeder arm 168 mounted to the drive bar 68 by means of a paper feeder pivot shaft 170 wherein the paper feeder arm 168 supports the roller 140 by means of a roller shaft 172 as well as a washer 174, bearings 176, a one-way clutch 178, and snap rings 180.

Referring specifically to FIG. 7, the paper feeder arm 168 causes the roller 140 to be continuously in contact with the bottom of the generally vertical stack of papers 134 by reason of the biasing of a pair of springs 182 on opposite sides of the paper feeder arm 168.

Referring to FIG. 3A, the support posts 162 may advantageously include rubber pads 184 on the top surfaces to counteract the effects of vibrational forces. It will also be noted that plastic bushings 186 may be utilized to facilitate the reciprocating movement of the side shafts 62 in the bores 64. In like fashion, a shaft bearing 188 may be provided for the vertical knockout shaft 98 which extends through a bore 190 in the casting 12.

Still referring to FIG. 3A, it will be appreciated that the knockout arm 100 is preferably secured to the knockout cup 102 by means of a cup spacer 192. It will also be seen that the knockout assembly 94 preferably includes a valve member 194. As shown, the valve member 194 is secured to the knockout cup 102 by means of a pair of screws 196 and a pair of washers 198.

Referring to FIG. 3B, the mold plate 16 is preferably secured to the drive bar 68 by means of a nut bar 200. It will also there be most clear as to the size and configuration of the front guard 160. As also shown, the patty machine 10 preferably includes a lower guard 202 to further enclose the moving components.

As shown in FIG. 3C, the main drive cylinder 70 is mounted to the drive bar 66 by means of a cylinder mounting block 04 which is in turn secured to the drive bar 66 by means of suitable fasteners. It will also there be seen that the limit switch 88 includes a switch trip arm 206 secured thereto which is the component which actually makes contact with the trip blocks 90 when the drive assembly 26 is reciprocating. As also shown in FIG. 3C, the drive assembly 26 may utilize a thrust washer 208 in conjunction with the lift and lock arm 106 and an impact washer 210 to reduce the effect of impact of the lift block 104 on the casting 12.

Referring to FIG. 7, the paper feeder assembly 130 will be seen to include a paper retaining pin 212 which is adapted to cooperate with corresponding holes in the papers 134. The paper retaining pin 212, in conjunction with the side walls 214 of the paper hopper 132, holds the papers in proper alignment therewithin. As shown, the paper retaining pin 212 has a bend portion 212a leading toward the roller 140 to facilitate removal of the papers one at a time for advancement into the paper feeder frame 138.

As for the frame 138, it will be noted that it includes an entry area as at 214 initially defined by an inclined flange 216 leading to a narrowed passageway as at 218. The papers are thus properly directed into the narrowed passageway as at 218 following which they enter the expanded area as at 220 wherein a patty may be removed from the patty mold opening 48 in the mold plate 16. When this occurs, the patty will drop as it is driven out by the knockout cup 102 into the expanded area 220 and will continue downward pulling the paper with it until it reaches the patty stacking surface 96.

In the illustrated embodiment, the patty stacking surface 96 comprises the surface of a fixed patty stack deck 222. This patty stack deck 222 is positioned such that it can accumulate a desired patty stack height following which an operator removes that stack of patties so that the machine can continue to make and discharge patties thereon. If desired, the patty stack deck 222 could be replaced by an indexing conveyor for a more automated form of operation.

Finally, it will be appreciated that the motion of the patty machine 10 is imparted by a directional valve and the speed is controlled by the hydraulic unit which consists of a tank, reservoir, pump, and valve.

As will be appreciated, not every component illustrated in the drawings has been described herein. It is believed, however, that the cooperation and functioning of all components illustrated will be entirely clear from the foregoing description. In addition, the foregoing description will make clear all unique aspects of the present invention.

While in the foregoing there has been set forth a preferred embodiment of the invention, it will be appreciated that the details herein given may be varied by those skilled in the art without departing from the true spirit and scope of the invention as defined by the appended claims.

We claim:

1. A patty machine, comprising: a casting having a cavity for receiving a material to be formed into a patty; an inlet for directing said material into said cavity at a point intermediate opposite ends thereof; a ram reciprocally disposed within said cavity at a point upstream of said inlet; a mold plate reciprocably disposed relative to said cavity at a point downstream of said inlet; and means for imparting simultaneous reciprocating movement to said ram and said mold plate; said cavity in said casting having a first portion extending generally in the direction of reciprocating movement of said ram and said mold plate and a second portion extending generally perpendicular to the direction of movement of said ram and said mold plate; said second portion of said cavity including a restricted passage leading from said first portion of said cavity to a mold-filling chamber axially offset from said ram and having a reduced cross-sectional area in comparison with said first portion of said cavity; said mold plate reciprocating into and out of communication with said mold filling chamber as said ram reciprocates toward and away from said restricted passage for forcing said material from said inlet through said cavity and into said mold plate.

2. The patty machine as defined in claim 1 wherein said cavity is formed in one face of said casting and including a fill plate generally covering said one face, said fill plate including an opening in communication with said mold-filling chamber and said mold plate reciprocating on said fill plate between a pair of guide rails for guiding reciprocating movement of said mold plate thereon, and further including a breather plate having a plurality of holes disposed generally above said mold-filling cavity and a cap plate disposed above said breather plate.

3. The patty machine as defined in claim 2 wherein said mold plate reciprocates between said fill plate and said breather plate, said mold plate having a patty mold opening therein, said holes in said breather plate communicating with a cavity covered by said cap plate for receiving air and material thereinto, said fill plate including a material hopper communicating with said inlet at a point axially adjacent one of said guide rails, said one of said guide rails including a slot providing communication between said cavity in said breather plate and said material hopper, and including a feed tray supported for communication with said material hopper for receiving a quantity of said material therein and a cage guard for said material hopper extending into said feed tray for allowing passage of only said material therethrough.

4. The patty machine as defined in claim 1 wherein said casting is generally rectangular in shape, said first portion of said cavity has a generally rectangular cross-section and said ram is a generally rectangular block to reciprocate therewithin, and said mold plate is generally rectangular in shape.

5. A patty machine, comprising: a casting having a cavity for receiving a material to be formed into a patty; an inlet for directing said material into said cavity at a point intermediate opposite ends thereof; a ram reciprocably disposed within said cavity at a point upstream of said inlet; a mold plate reciprocably disposed relative to said cavity at a point downstream of said inlet; and means for imparting simultaneous reciprocating movement to said ram and said mold plate; said reciprocating movement imparting means comprising a hydraulic reciprocating drive assembly adapted to drive said mold plate and said ram is generally parallel simultaneous reciprocating movement relative to said casting; said drive assembly including a pair of generally parallel said shafts, said side shafts extending through corresponding bores in said casting, said side shafts being interconnected at opposite ends by a pair of drive bars; said drive assembly also including a main drive cylinder interconnected to one of said drive bars for imparting reciprocating movement, said ram and said mold plate also being interconnected to one of said drive bars for driven movement by said main drive cylinder; and including a ram cylinder interconnecting said ram to said one of said drive bars for imparting only a preselected pressure to said material in said cavity when said main drive cylinder is imparting reciprocating movement to said drive assembly.

6. The patty machine as defined in claim 5 including means for adjusting said preselected pressure in the form of a hydraulic fluid flow vale, said fluid flow valve causing said ram cylinder to release pressure on said ram in a manner maintaining said preselected pressure on said material, said ram cylinder receiving hydraulic fluid under pressure from a source, said drive assembly including a bypass comprising a hydraulic fluid return flow path through which said ram cylinder returns hydraulic fluid to said source, said hydraulic fluid return flow path including a port in said one of said drive bars, said ram cylinder communicating with said port, at least said one of said drive bars having a passage leading from said port to said source.

7. The patty machine as defined in claim 6 wherein said hydraulic fluid return flow path includes a further passage leading from said passage in said one of said drive bars through one of said side shafts to a hydraulic fluid flow line extending to said source of hydraulic fluid.

8. The patty machine as defined in claim 5 including limit switch means for limiting travel of said drive assembly in each direction during reciprocating movement, said limit switch means including a limit switch mounted to said drive assembly and a pair of trip blocks fixedly mounted in spaced apart relation.

9. The patty machine as defined in claim 2 wherein said mold plate has a patty mold opening therein for reciprocating movement into and out of communication with said cavity for receiving said material as said ram undergoes reciprocating movement toward and away from said inlet, respectively, said ram forcing said material into said patty mold opening to form a patty, and including means for removing said patty from said patty mold opening when said mold plate has undergone reciprocating movement out of communication with said cavity, said mold plate reciprocating in a generally horizontal plane, said patty removing means including a knock out assembly mounted for vertical reciprocating movement, and including a patty receiving surface disposed below said generally horizontal plane.

10. The patty machine as defined in claim 9 wherein said knock out assembly includes a vertical knock out shaft, a knock out arm extending from one end thereof so as to be disposed generally above said mold plate, and a knock out cup conforming to said patty mold opening and supported by said knock out arm, said knock out assembly also including a lift block secured to the end of said vertical knock out shaft remote from said knock out arm and a pivoting knock out lift arm secured to said lift block for imparting reciprocating vertical movement to said knock out shaft, said knock out assembly further including a drive pivot block secured to said casting, said lift arm being mounted for pivotable movement to said drive pivot block, and a drive cylinder connected to said lift arm through a clevis block.

11. The patty machine as defined in claim 10 wherein said knock out assembly further includes a knock out lock latch mounted for pivotable movement to said drive pivot block, said lock latch and lift arm having overlapping teeth adapted for engagement for locking said lift arm in position, said knock out assembly further including a latching bar having a pusher plate mounted thereon for movement toward engagement of a pin on said lock latch to cause said lock latch to pivot against the biasing force of a spring to disengage said overlapping teeth, said lock latch and latching bar also have overlapping teeth adapted for locked engagement, said overlapping teeth of said lock latch and latching bar engaging as said overlapping teeth of said lock latch and lift arm are disengaging.

12. The patty machine as defined in claim 11 wherein said drive cylinder drives said knock out shaft in one cycle first down and then up through said clevis block, lift arm and lift block by reversing direction through limit switch means sensitive to travel of said drive cylinder relative to said casting.

13. The patty machine as defined in claim 12 wherein said spring reengages said overlapping teeth of said lock latch and lift arm following said one cycle, said spring also then causing said overlapping teeth of said lock latch and latching bar to disengage for movement of said latching arm away from said pin.

14. The patty machine as defined in claim 9 including a paper feeder assembly comprising a paper hopper adapted to hold papers in a generally vertical stack and a spring biased roller engaging the bottom of said generally vertical stack including means for driving said roller in a single direction, said paper feeder assembly further comprising an individual paper receiving frame adjacent said generally vertical stack, said roller being adapted to feed said papers one at a time from said generally vertical stack into said paper receiving frame, said paper receiving frame being positioned below said generally horizontal plane of reciprocation of said mold plate and above said patty receiving surface in substantial vertical alignment with said knock out assembly.

15. The patty machine as defined in claim 14 including a proximity switch permitting machine operation only when engaged, said paper feeder assembly being removably mounted to said patty machine, said paper feeder assembly including means for engaging said proximity switch only when mounted to said patty machine.

16. In a patty machine having reciprocating means for delivering a material to be formed into a patty into a patty mold opening, the improvement comprising:
a casting having a cavity defined by a first portion extending generally in the direction of movement of said reciprocating means and a second portion extending generally perpendicular to the direction of movement of said reciprocating means;
said second portion of said cavity including a restricted passage leading from said first portion of said cavity to a mold-filling chamber axially offset from said reciprocating means and having a reduced cross-sectional area in comparison with said first portion of said cavity;
said cavity being formed in one face of said casting and including a fill plate generally covering said one face, said fill plate including an opening in communication with said mold-filling chamber, said patty mold opening being adapted to receive said material through said opening in said fill plate.

17. The patty machine as defined in claim 16 wherein said fill plate includes a pair of guide rails for guiding reciprocating movement of a mold plate having said patty mold opening therein, and including a breather plate having a plurality of holes disposed generally above said mold-filling chamber and a cap plate disposed above said breather plate.

18. The patty machine as defined in claim 17 wherein said mold plate reciprocates between said fill plate and said breather plate, said patty mold opening selectively communicating with said opening in said fill plate, said holes in said breather plate communicating with a cavity covered by said cap plate for receiving air and material thereinto.

19. The patty machine as defined in claim 18 wherein said fill plate includes a material hopper communicating with said cavity in said casting at a point axially adjacent one of said guide rails, said one of said guide rails including a slot providing communication between said cavity in said breather plate and said material hopper.

20. The patty machine as defined in claim 19 including a feed tray supported for direct communication with said material hopper for receiving a quantity of said material therein, and further including a cage guard for said material hopper extending into said feed tray for allowing passage of only said material into said material hopper.

21. The patty machine as defined in claim 17 wherein said casting is generally rectangular in shape, said first portion of said cavity has a generally rectangular cross-section and said reciprocating means is a generally rectangular ram to reciprocate therewithin, and said mold plate is generally rectangular in shape.

22. In a patty machine having reciprocating means for delivering a material to be formed into a patty into a patty mold opening of a mold plate, the improvement comprising: a hydraulic reciprocating drive assembly adapted to drive said mold plate and said material delivery reciprocating means in generally parallel simultaneous reciprocating movement relative to a casting; said drive assembly including a pair of generally parallel side shafts extending through corresponding generally parallel bores in said casting and interconnected at opposite ends by drive bars; said drive assembly also including a main drive cylinder interconnected to one of said drive bars with said mold plate and reciprocating material delivering means being interconnected to the other of said drive bars; said drive assembly causing said mold plate and said reciprocating material delivering means to undergo simultaneous reciprocating driven movement; said reciprocating material delivering means including a ram having a ram cylinder interconnecting said ram to said other of said drive bars for imparting only a preselected pressure to said material when said main drive cylinder is imparting reciprocating movement to said drive assembly; and means for adjusting said preselected pressure in the form of a hydraulic fluid flow valve, said hydraulic fluid flow valve causing said ram cylinder to release pressure on said ram in a manner maintaining said preselected pressure as said material is formed into a patty in said patty mold opening.

23. The patty machine as defined in claim 22 wherein said ram cylinder receives hydraulic fluid under pressure from a source of hydraulic fluid, said drive assembly including a bypass comprising a hydraulic fluid return flow path through which said ram cylinder returns hydraulic fluid to said source of hydraulic fluid.

24. The patty machine as defined in claim 23 wherein said hydraulic fluid return flow path includes a port in said other of said drive bars, said ram cylinder communicating with said port, at least said one of said drive bars having a passage leading from said port to said source.

25. The patty machine as defined in claim 24 wherein said hydraulic fluid return flow path includes a further passage leading from said passage in said other of said drive bars through one of said side shafts to a hydraulic fluid flow line extending to said source of hydraulic fluid.

26. The patty machine as defined in claim 22 including limit switch means for limiting travel of said drive assembly in each direction during reciprocating movement, said limit switch means including a limit switch mounted to said drive assembly and a pair of trip blocks fixedly mounted in spaced apart relation.

27. In a patty machine having reciprocating means for delivering a material to a patty mold opening of a reciprocating mold plate for forming said material into a patty while said material is in communication with said patty mold opening of said reciprocating mold plate, the improvement comprising: means for removing said patty from said patty mold opening when said mold plate has undergone reciprocating movement to a position out of communication with said material; said mold plate reciprocating in a generally horizontal plane, said patty removing means including a knock out assembly mounted for vertical reciprocating movement toward and away from said mold plate, and including a patty receiving surface disposed below said generally horizontal plane; said knock out assembly including a vertical knock out shaft, a knock out arm extending from one end thereof so as to be disposed generally above said mold plate, and a knock out cup conforming to said patty mold opening and supported by said know out arm; said knock out assembly also including a lift block secured to the end of said vertical knock out shaft remote from said knock out arm and a pivoting knock out lift arm secured to said lift block for imparting reciprocating vertical movement to said knock out shaft; said knock out assembly further including a drive pivot block mounted in a fixed position, said lift arm being mounted for pivotable movement to said drive pivot block, and a drive cylinder connected to said lift arm through a clevis block.

28. The patty machine as defined in claim 27 wherein said knock out assembly further includes a knock out lock latch mounted for pivotable movement to said drive pivot block, said lock latch and lift arm having overlapping teeth adapted for engagement for locking said lift arm in position.

29. The patty machine as defined in claim 28 wherein said knock out assembly further includes a latching bar having a pusher plate mounted thereon for movement toward engagement of a pin on said lock latch to cause said lock latch to pivot against the biasing force of a spring to disengage said overlapping teeth.

30. The patty machine as defined in claim 24 wherein said lock latch and latching bar also have overlapping teeth adapted for locked engagement, said overlapping teeth of said lock latch and latching bar engaging as said overlapping teeth of said lock latch and lift arm are disengaging.

31. The patty machine as defined in claim 30 wherein said drive cylinder drives said knock out shaft in one cycle first down and then up through said clevis block, lift arm and lift block by reversing direction through limit switch means sensitive to travel of save drive cylinder relative to a fixed surface.

32. The patty machine as defined in claim 31 wherein said spring reengages said overlapping teeth of said lock latch and lift arm following said one cycle, said spring also then causing said overlapping teeth of said lock latch and latching bar to disengage for movement of said latching arm away from said pin.

33. In a patty machine having reciprocating means for delivering a material to a patty mold opening of a reciprocating mold plate for forming said material into a patty while said material is in communication with said patty mold opening of said reciprocating mold plate, the improvement comprising:
a paper feeder assembly comprising a paper hopper adapted to hold papers in a generally vertical stack and a spring biased roller engaging the bottom of said generally vertical stack including means for driving said roller in a single direction, said paper feeder assembly providing a supply of papers in said paper hopper and said spring biased roller delivering said papers one at a time to a point of discharge of patties from said patty mold opening for forming a paper separated patty stack.

34. The patty machine as defined in claim 33 wherein said paper feeder assembly further comprises an individual paper receiving frame adjacent said generally vertical stack of papers, said roller being adapted to feed said papers one at a time from said generally vertical stack into said paper receiving frame.

35. The patty machine as defined in claim 34 wherein said paper receiving frame is positioned below said reciprocating mold plate and above a patty receiving surface in substantial vertical alignment with a patty knock out assembly.

36. The patty machine as defined in claim 35 including a proximity switch permitting machine operation only when engaged, said paper feeder assembly being removably mounted to said patty machine, said paper feeder assembly including means for engaging said proximity switch only when mounted to said patty machine.

37. A patty machine, comprising:
a casting having a cavity for receiving a material to be formed into a patty;
an inlet for directing said material into said cavity at a point intermediate opposite ends thereof;
a ram reciprocably disposed within said cavity at a point upstream of said inlet;
a mold plate reciprocably disposed relative to said cavity at a point downstream of said inlet; and
said cavity in said casting having a first portion extending generally in the direction of reciprocating movement of said ram and said mold plate and a second portion extending generally perpendicular to the direction of movement of said ram and said mold plate;
said second portion of said cavity including a restricted passage leading from said first portion of said cavity to a mold-filling chamber axially offset from said ram and having a reduced cross-sectional area in comparison with said first portion of said cavity;
said cavity being formed in one face of said casting and including a fill plate generally covering said one face, said fill plate including an opening in communication with said mold-filling chamber, said mold plate having a patty mold opening and reciprocating on said fill plate.

38. The patty machine as defined in claim 37 wherein said fill plate includes a pair of guide rails for guiding reciprocating movement of said mold plate thereon, and including a breather plate having a plurality of holes disposed generally above said mold-filling chamber and a cap plate disposed above said breather plate.

39. The patty machine as defined in claim 38 wherein said mold plate reciprocates between said fill plate and said breather plate, said patty mold opening selectively communicating with said opening in said fill plate, said holes said cap plate for receiving air and material thereinto.

40. The patty machine as defined in claim 39 wherein said fill plate includes a material hopper communicating with said inlet at a point axially adjacent one of said guide rails, said one of said guide rails including a slot providing communication between said cavity in said breather plate and said material hopper.

41. The patty machine as defined in claim 40 including a feed tray supported for direct communication with said material hopper for receiving a quantity of said material therein, and further including a cage guard for said material hopper extending into said feed tray for allowing passage of only said material into said material hopper.

42. The patty machine as defined in claim 37 wherein said casting is generally rectangular in shape, said first portion of said cavity has a generally rectangular cross-section and said ram is a generally rectangular block to reciprocate therewithin, and said mold plate is generally rectangular in shape.

43. A patty machine, comprising:
a casting having a cavity for receiving a material to be formed into a patty;
an inlet for directing said material into said cavity at a point intermediate opposite ends thereof;
a ram reciprocably disposed within said cavity at a point upstream of said inlet;
a mold plate reciprocably disposed relative to said cavity at a point downstream of said inlet; and
means for imparting simultaneous reciprocating movement to said ram and said mold plate;

said cavity in said casting having a first portion extending generally in the direction of reciprocating movement of said ram and said mold plate and a second portion extending generally perpendicular thereto;

said second portion of said cavity including a restricted passage leading from said first portion of said cavity to a mold-filling chamber axially offset from said ram and having a reduced cross-sectional area in comparison with said first portion of said cavity;

said reciprocating movement imparting means comprising a hydraulic reciprocating drive assembly adapted to drive said mold plate and said ram in generally parallel simultaneous reciprocating movement relative to said casting;

said drive assembly including a pair of generally parallel side shafts, said side shafts extending through corresponding generally parallel bores in said casting, said side shafts being interconnected at opposite ends by respective internal and external drive bars;

said drive assembly also including a main drive cylinder interconnected to said internal drive bar, said ram and said mold plate being interconnected to said external drive bar for driven movement by said main drive cylinder.

44. The patty machine as defined in claim 43 including a ram cylinder interconnecting said ram to said external drive bar for imparting only a preselected pressure to said material in said cavity when said main drive cylinder is imparting reciprocating movement to said drive assembly.

45. The patty machine as defined in claim 44 including means for adjusting said preselected pressure in the form of a hydraulic fluid flow valve, said fluid flow valve causing said ram cylinder to release pressure on said ram in a manner maintaining said preselected pressure on said material.

46. The patty machine as defined in claim 45 wherein said ram cylinder receives hydraulic fluid under pressure from a source, said drive assembly including a bypass comprising a hydraulic fluid return flow path through which said ram cylinder returns hydraulic fluid to said source.

47. The patty machine as defined in claim 46 wherein said hydraulic fluid return flow path includes a port in said external drive bar, said ram cylinder communicating with said port, at least said one of said drive bars having a passage leading from said port to said source.

48. The patty machine as defined in claim 47 wherein said hydraulic fluid return flow path includes a further passage leading from said passage in said external drive bar through one of said side shafts to a hydraulic fluid flow line extending to said source of hydraulic fluid.

49. The patty machine as defined in claim 43 including limit switch means for limiting travel of said drive assembly in each direction during reciprocating movement, said limit switch means including a limit switch mounted to said drive assembly and a pair of trip blocks fixedly mounted in spaced apart relation.

50. A patty machine, comprising:
a casting having a cavity for receiving a material to be formed into a patty;
an inlet for directing said material into said cavity at a point intermediate opposite ends thereof;
a ram reciprocably disposed within said cavity at a point upstream of said inlet; and
a mold plate reciprocably disposed relative to said cavity at a point downstream of said inlet;

said cavity in said casting having a first portion extending generally in the direction of reciprocating movement of said ram and said mold plate and a second portion extending generally perpendicular to the direction of movement of said ram and said mold plate;

said second portion of said cavity including a restricted passage leading from said first portion of said cavity to a mold-filling chamber axially offset from said ram and having a reduced cross-sectional area in comparison with said first portion of said cavity;

said cavity being formed in one face of said casting and including a fill plate generally covering said one face, said fill plate including an opening in communication with said mold-filling chamber, said mold plate having a patty mold opening and reciprocating on said fill plate;

said patty mold opening of said mold plate being adapted for reciprocating movement into and out of communication with said opening in said fill plate for receiving said material as said ram undergoes reciprocating movement toward and away from said inlet, respectively;

said ram forcing said material into said patty mold opening to form a patty, and including means for removing said patty from said patty mold opening when said mold plate has undergone reciprocating movement out of communication with said opening in said fill plate;

said mold plate reciprocating in a generally horizontal plane, said patty removing means including a knock out assembly mounted for vertical reciprocating movement toward and away from said mold plate, and including a patty receiving surface disposed below said generally horizontal plane.

51. The patty machine as defined in claim 50 wherein said knock out assembly includes a vertical knock out shaft, a knock out arm extending from one end thereof so as to be disposed generally above said mold plate, and a knock out cup conforming to said patty mold opening and supported by said knock out arm.

52. The patty machine as defined in claim 51 wherein said knock out assembly also includes a lift block secured to the end of said vertical knock out shaft remote from said knock out arm and a pivoting knock out lift arm secured to said lift block for imparting reciprocating vertical movement to said knock out shaft.

53. The patty machine as defined in claim 52 wherein said knock out assembly further includes a drive pivot block secured to said casting, said lift arm being mounted for pivotable movement to said drive pivot block, and a drive cylinder connected to said lift arm through a clevis block.

54. The patty machine as defined in claim 53 wherein said knock out assembly further includes a knock out lock latch mounted for pivotable movement to said drive pivot block, said lock latch and lift arm having overlapping teeth adapted for engagement for locking said lift arm in position.

55. The patty machine as defined in claim 54 wherein said knock out assembly further includes a latching bar having a pusher plate mounted thereon for movement toward engagement of a pin on said lock latch to cause said lock latch to pivot against the biasing force of a spring to disengage said overlapping teeth.

56. The patty machine as defined in claim 55 wherein said lock latch and latching bar also have overlapping teeth adapted for locked engagement, said overlapping teeth of said lock latch and latching bar engaging as said overlapping teeth of said lock latch and lift arm are disengaging.

57. The patty machine as defined in claim 56 wherein said drive cylinder drives said knock out shaft in one cycle first down and then up through said clevis block, lift arm and lift block by reversing direction through limit switch means sensitive to travel of save drive cylinder relative to said casing.

58. The patty machine as defined in claim 57 wherein said spring reengages said overlapping teeth of said lock latch and lift arm following said one cycle, said spring also then causing said overlapping teeth of said lock latch and latching bar to disengage for movement of said latching arm away from said pin.

59. A patty machine, comprising:
- a casting having a cavity for receiving a material to be formed into a patty;
- an inlet for directing said material into said cavity at a point intermediate opposite ends thereof;
- a rm reciprocably disposed within said cavity at a point upstream of said inlet;
- a mold plate reciprocably disposed relative to said cavity at a point downstream of said inlet;
- said cavity in said casting having a first portion extending generally in the direction of reciprocating movement of said ram and said mold plate and a second portion extending generally perpendicular to the direction of movement of said ram and said mold plate;
- said second portion of said cavity including a restricted passage leading from said first portion of said cavity to a mold-filling chamber axially offset from said ram and having a reduced cross-sectional area in comparison with said first portion of said cavity;
- said cavity being formed in one face of said casting and including a fill plate generally covering said one face, said fill plate including an opening in communication with said mold-filling chamber, said mold plate having a patty mold opening and reciprocating on said fill plate; and
- a paper feeder assembly comprising a paper hopper adapted to hold papers in a generally vertical stack and a spring biased roller engaging the bottom of said generally vertical stack including means for driving said roller in a single direction.

60. The patty machine as defined in claim 59 wherein said paper feeder assembly further comprises an individual paper receiving frame adjacent said generally vertical stack, said roller being adapted to feed said papers one at a time from said generally vertical stack into said paper receiving frame.

61. The patty machine as defined in claim 60 wherein said paper receiving frame is positioned below said generally horizontal plane of reciprocation of said mold plate and above said patty receiving surface in substantial vertical alignment with said knock out assembly.

62. The patty machine as defined in claim 59 including a proximity switch permitting machine operation only when engaged, said paper feeder assembly being removably mounted to said patty machine, said paper feeder assembly including means for engaging said proximity switch only when mounted to said patty machine.

* * * * *